(12) United States Patent
Cao et al.

(10) Patent No.: US 12,525,158 B2
(45) Date of Patent: Jan. 13, 2026

(54) DISPLAY PANEL

(71) Applicant: SHENZHEN CHINA STAR OPTOELECTRONICS SEMICONDUCTOR DISPLAY TECHNOLOGY CO., LTD., Shenzhen (CN)

(72) Inventors: Wu Cao, Shenzhen (CN); Longqiang Shi, Shenzhen (CN); Baixiang Han, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 159 days.

(21) Appl. No.: 18/383,634

(22) Filed: Oct. 25, 2023

(65) Prior Publication Data

US 2024/0221554 A1    Jul. 4, 2024

(30) Foreign Application Priority Data

Dec. 30, 2022   (CN) .......................... 202211735255.3

(51) Int. Cl.
*G09G 3/00* (2006.01)

(52) U.S. Cl.
CPC ......... *G09G 3/006* (2013.01); *G09G 2330/06* (2013.01); *G09G 2330/12* (2013.01)

(58) Field of Classification Search
CPC ............... G09G 3/006; G09G 2330/06; G09G 2330/12; G02F 1/1309; G02F 1/13458; G02F 1/136213; G02F 1/136286
See application file for complete search history.

(56) References Cited

U.S. PATENT DOCUMENTS

| 2012/0193622 | A1* | 8/2012 | Takahashi | H01L 22/32 257/E23.06 |
| 2013/0161749 | A1* | 6/2013 | Kim | H10D 89/811 257/E23.079 |
| 2018/0033354 | A1* | 2/2018 | Lee | G09G 3/006 |
| 2019/0027104 | A1* | 1/2019 | Zhang | G09G 3/20 |
| 2019/0280074 | A1* | 9/2019 | Li | H10D 86/60 |
| 2021/0201719 | A1* | 7/2021 | Lee | G09G 3/006 |

(Continued)

*Primary Examiner* — Akm Zakaria
(74) *Attorney, Agent, or Firm* — The Roy Gross Law Firm, LLC; Roy D. Gross (57) ABSTRACT

A display panel is provided, including a display area, a non-display area, signal lines arranged in the display area, test pads, test lines arranged in the non-display area, and first electrostatic protection units. Each test line is electrically connected to each respective signal line. One end of each test pad is electrically connected to each respective test line. Another end of each test pad is electrically connected to a common line. One end of each first electrostatic protection unit is connected to the corresponding test pad, and another end of each first electrostatic protection unit is electrically connected to the common line. By placing the first electrostatic protection units on one side of the test pads away from the display area, when testing the display panel through the test pads, the first electrostatic protection units effectively protect circuits of the display panel and prevent issues such as ESD electrostatic damage.

20 Claims, 3 Drawing Sheets

(56) References Cited

U.S. PATENT DOCUMENTS

| | | | |
|---|---|---|---|
| 2022/0114971 A1* | 4/2022 | Chen | G09G 3/3233 |
| 2022/0320229 A1* | 10/2022 | Du | G09G 3/3225 |
| 2023/0316969 A1* | 10/2023 | Ding | G09G 3/006 |
| | | | 324/537 |

* cited by examiner

FIG. 5

DISPLAY PANEL

CROSS REFERENCE TO RELATED APPLICATIONS

This application claims the benefit of priority of Chinese Patent Application No. 202211735255.3, filed Dec. 30, 2022, the contents of which is incorporated herein by reference in its entirety.

FIELD OF DISCLOSURE

The present application relates to a technical field of design and manufacturing of display panels, and in particular, to a display panel.

DESCRIPTION OF RELATED ART

With the continuous development of display panel manufacturing technology, people have raised higher demands for various performance aspects of display panels and devices.

In conventional technology, when preparing a display panel, various manufacturing processes are required. During the processing, due to the influence of the corresponding processing environment and process structure, as well as the complexity of circuit connections and processes within the display panel, there is a buildup of electrostatic charge and electrostatic discharge (ESD), leading to the occurrence of ESD damage in various processes and a decrease in yield. In conventional technology, display panels generally also have array test (AT) terminals and cell test (CT) terminals for testing various performance aspects of the display panel. However, these testing terminals are typically exposed, which further increases the probability of ESD occurrences, making it easier for ESD damage to occur. This can lead to the dielectric breakdown of integrated circuit chip, wire fuse, increased leakage current, accelerated aging, changes in electrical performance parameters, and more, without providing protection to the circuits within the display panel, thereby reducing the quality and reliability of the display panel.

In summary, in conventional technology, the display panels produced have exposed testing terminals, which make the circuits within the display panel more susceptible to ESD damage, leading to a decrease in the quality and reliability of the display panel.

SUMMARY OF INVENTION

The embodiments of the present application provide a display panel, effectively addressing the issue in conventional display panels where the unreasonable design of testing terminals leads to a susceptibility to ESD (Electro-Static Discharge) damage, consequently reducing the quality and reliability of the display panel.

In order to solve the above technical issues, the present application provides a display panel, including a display area and a non-display area arranged on one side of the display area, the display panel including:
  a plurality of signal lines disposed at least in the display area;
  a plurality of test lines disposed in the non-display area, each of the test lines electrically connected to a respective corresponding one of the signal lines;
  a plurality of test pads, one end of each of the test pads electrically connected to one end of a respective corresponding one of the test lines; and
  a plurality of first electrostatic protection units, one end of each of the first electrostatic protection units connected to another end of a respective corresponding one of the test pads, another end of each of the first electrostatic protection units electrically connected to a common line.

According to one embodiment of the present application, each of the first electrostatic protection units includes:
  a thin-film transistor;
  a first capacitor, one end of the first capacitor electrically connected to a gate of the thin-film transistor, another end of the first capacitor electrically connected to a first output terminal and a source of the thin-film transistor; and
  a second capacitor, one end of the second capacitor electrically connected to the gate of the thin-film transistor and one end of the first capacitor, another end of the second capacitor electrically connected to a drain of the thin-film transistor and a first input terminal.

According to one embodiment of the present application, a capacitance value of the first capacitor is equal to a capacitance value of the second capacitor.

According to one embodiment of the present application, the test pads include a VSS test pad, and the first output terminal of each of the first electrostatic protection units is electrically connected to the VSS test pad.

According to one embodiment of the present application, each of the first electrostatic protection units further includes:
  a first thin-film transistor, wherein a source of the first thin-film transistor is electrically connected to a second output terminal;
  a second thin-film transistor, wherein a gate of the second thin-film transistor is electrically connected to a gate of the first thin-film transistor and a second input terminal, a source of the second thin-film transistor is electrically connected to a drain of the first thin-film transistor, and a drain of the second thin-film transistor is electrically connected to the second input terminal;
  a third thin-film transistor, wherein a source of the third thin-film transistor is electrically connected to the drain of the second thin-film transistor and the second input terminal; and
  a fourth thin-film transistor, wherein a gate of the fourth thin-film transistor is electrically connected to a gate of the third thin-film transistor and a third output terminal, a drain of the fourth thin-film transistor is electrically connected to the third output terminal, and a source of the fourth thin-film transistor is electrically connected to a drain of the third thin-film transistor.

According to one embodiment of the present application, the second output terminal and the third output terminal are electrically connected to different respective ones of the test pads.

According to one embodiment of the present application, the test pads include a CK test pad, a STV test pad, a VGL test pad, a VGH test pad, a VDD test pad, and a VSS test pad, wherein each of the test pads is electrically connected to a respective corresponding one of the test lines, and a number of the test pads is greater than a number of the electrostatic protection units.

According to one embodiment of the present application, an area of the VSS test pad is greater than areas of the CK test pad, the STV test pad, the VGL test pad, the VGH test pad, and the VDD test pad.

According to one embodiment of the present application, one end of each of the electrostatic protection units is electrically connected to a respective corresponding one of the CK test pad, the STV test pad, the VGL test pad, the VGH test pad, and the VDD test pad, wherein an output terminal of each of the electrostatic protection units is electrically connected to the VSS test pad.

According to one embodiment of the present application, the display panel further includes a plurality of second electrostatic protection units, wherein one end of each of the second electrostatic protection units is electrically connected to a respective corresponding one of the signal lines, and another end of each of the second electrostatic protection units is electrically connected to a respective corresponding one of the test lines.

Advantages of the embodiments of the present application: Compared to the conventional technology, the present application provides a display panel including a display area and a non-display area, multiple signal lines disposed in the display area, test pads, multiple test lines disposed in the non-display area, and a plurality of first electrostatic protection units. Each test line is electrically connected to each respective signal line. One end of each test pad is electrically connected to each respective test line, and the other end of each test pad is electrically connected to a common line. In this embodiment, by placing multiple first electrostatic protection units on one side of the test pads away from the display area, when testing the display panel through the test pads, the first electrostatic protection units can effectively reduce issues such as conduction impedance and uneven voltage drops. This helps protect the circuitry of the display panel and prevents problems such as ESD electrostatic damage.

BRIEF DESCRIPTION OF DRAWINGS

To provide a clearer explanation of the embodiments of the present application or technical solutions in the conventional techniques, the following brief introduction to the accompanying drawings required in the description of the embodiments or the conventional techniques is provided. It is evident that the drawings described below are only some of the embodiments in this application. Those skilled in the art can obtain additional drawings based on these drawings without creative efforts.

DETAILED DESCRIPTION OF EMBODIMENTS

Below, in conjunction with the accompanying drawings in the embodiments of the present application, various embodiments or examples are provided in the following text to realize different structures of the present application. In order to simplify the present application, descriptions are provided for specific examples of components and settings. Furthermore, the present application provides examples of various specific processes and materials, which those skilled in the art can recognize for the application of other processes. All other embodiments obtained by those skilled in the art without creative efforts fall within the protection scope of the present application.

In the description of the present application, it should be understood that terms such as "center", "longitudinal", "lateral", "length", "width", "thickness", "top", "bottom", "front", "back", "left", "right", "vertical", "horizontal", "top", "bottom", "inner", "outer", "clockwise", "counter-clockwise", and the like indicating orientation or positional relationships are based on the orientation or positional relationships shown in the drawings, solely for the purpose of describing the present application and simplifying the description. They do not indicate or imply that the device or element referred to must have a specific orientation, be constructed or operated in a specific orientation, and should not be construed as limiting the present application. Furthermore, the terms "first" and "second" are used for descriptive purposes only and should not be construed as indicating or implying relative importance or a specific quantity of the indicated technical features.

With the continuous development of array substrate and display panel manufacturing technologies, there are increasing demands for the performance and display quality of display panels.

Display panels contain various driving circuits, and when testing the performance of the display panel, testing is typically conducted using testing terminals located in non-display areas. However, in conventional technology, these testing terminals are generally exposed on the substrate's surface. Due to the complex structure of the various circuits and the exposed nature of these testing terminals, when conducting tests with testing probes, the display panel is prone to experiencing electro-static discharge (ESD) damage, consequently reducing the quality and reliability of the display panel.

The embodiments of this present application provide a display panel aimed at effectively addressing the issue of ESD damage occurring within the display panel, thereby protecting the circuits in the display panel and enhancing the overall performance of the display panel.

Figure 1:
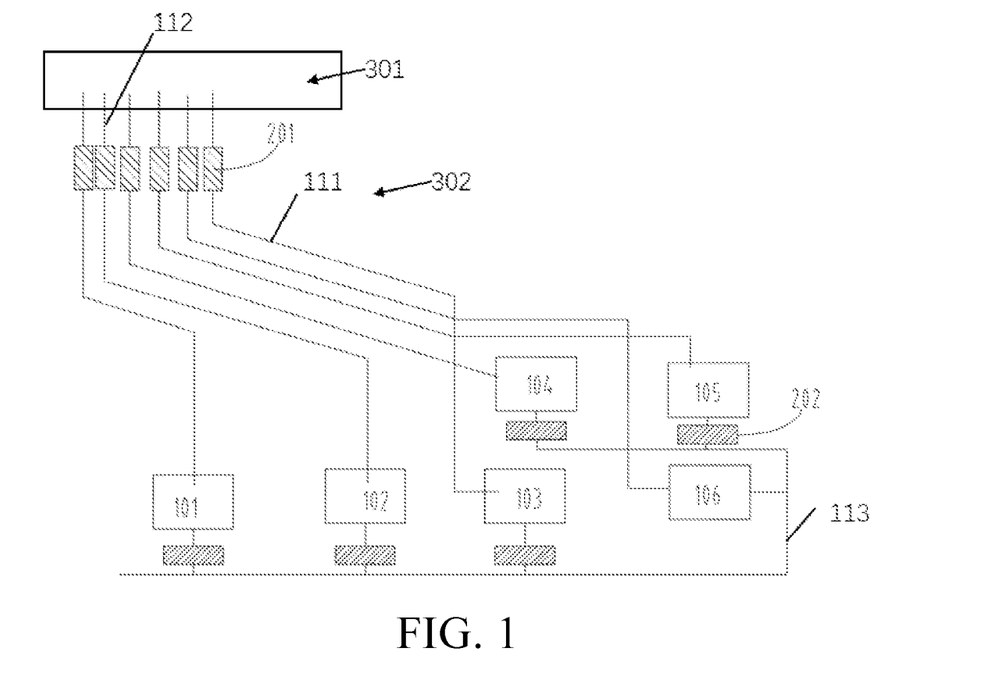
FIG. 1 is a schematic diagram of a wiring structure of a display panel provided in the embodiments of the present application.

As shown in FIG. 1, FIG. 1 is a schematic diagram of a wiring structure of a display panel provided in the embodiments of the present application. The display panel includes a display area 301 and a non-display area 302 arranged on at least one side of the display area 301. In the embodiments of this application, the non-display area 302 can correspond to a testing area. Multiple different testing terminals or pads are set in this testing area. When testing the display panel, connections are made between the testing probes and the corresponding testing terminals or pads to test circuits in the display panel.

In the embodiments of the present application, the display panel includes a plurality of signal lines 112. Each of the signal lines 112 can transmit different control signals. Meanwhile, these signal lines 112 are at least arranged within the display area 301 and extend a certain length into the non-display area 302 to establish connections with other signal lines. In the following embodiments, different signal lines such as CK signal lines, STV signal lines, VGL signal lines, VGH signal lines, VDD signal lines, and VSS signal lines are used as examples for illustration.

These different signal lines extend into the non-display area 302 and are electrically connected to one end of the corresponding test lines 111. It should be noted that the signal lines mentioned can also be other types of signal transmission lines, which are not elaborated here.

Furthermore, after the aforementioned multiple signal lines 112 have been set up, each test line 111 extends towards one side of the non-display area 302 and electrically connects with the corresponding test pad. Specifically, the CK test line is electrically connected to a CK test pad 101, the STV test line is electrically connected to a STV test pad 102, the VGL test line is electrically connected to a VGL test pad 103, the VGH test line is electrically connected to a VGH test pad 104, the VDD test line is electrically connected to a VDD test pad 105, and the VSS test line is electrically connected to a VSS test pad 106.

In the embodiments of the present application, when setting up the test pads, one end of each test pad is electrically connected to the corresponding test line, and the other end of each test pad is electrically connected to a common line 113. Additionally, the display panel includes a first electrostatic protection unit 202. Multiple first electrostatic protection units 202 are arranged corresponding to the test pads. Specifically, there is a first electrostatic protection unit 202 disposed under each of the CK test pad 101, the STV test pad 102, the VGL test pad 103, the VGH test pad 104, and the VDD test pad 105. One end of the first electrostatic protection unit 202 is electrically connected to the other end of the corresponding test pad, and the other end of the first electrostatic protection unit 202 is electrically connected to the same common line 113.

In the embodiments of the present application, when setting up the above-mentioned various test lines 111, the different test lines can be arranged to cross each other, such as the VGL test line corresponding to the VGL test pad 103 crossing and being electrically insulated from the VGH test line corresponding to the VGH test pad 104. Such configuration can save space in the non-display area as much as possible and achieve a narrow bezel display panel.

Specifically, the other end of each first electrostatic protection unit 202 is electrically connected to the same common line 113. The common line 113 is directly electrically connected to the VSS test pad 106. When the first electrostatic protection unit 202 acts on static electricity within the display panel, the static electricity in the circuit can be transmitted through the common line 113 to the VSS test pad 106 and eliminated, thereby protecting the circuit.

Figure 2:
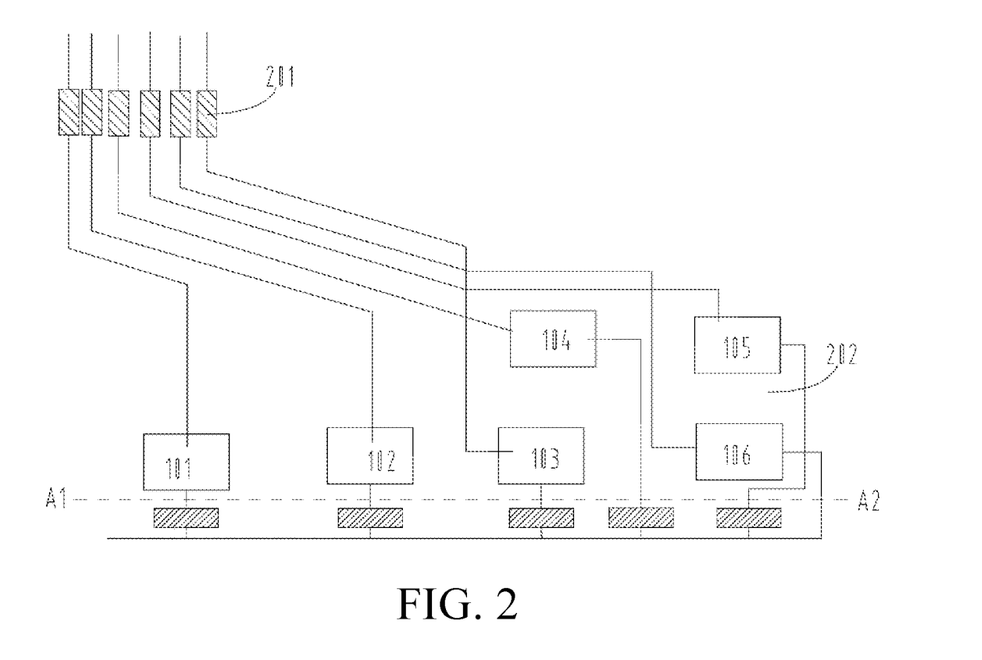
FIG. 2 is a schematic diagram of another wiring structure of the display panel provided in the embodiments of the present application.

In the embodiments of the present application, when setting up the above-mentioned multiple first electrostatic protection units 202, as shown in FIG. 2, FIG. 2 is a schematic diagram of another wiring structure of the display panel provided in the embodiments of this application. In conjunction with FIG. 1, in the present application, when setting up the above-mentioned multiple first electrostatic protection units 202, the first electrostatic protection units 202 are correspondingly placed beneath a cutting line A1-A2 of the display panel. During various testing processes for the display panel, these first electrostatic protection units 202 provide electrostatic protection to the circuits. After testing is completed, the first electrostatic protection units 202 can be removed, ensuring normal operations of the display panel.

Figure 3:
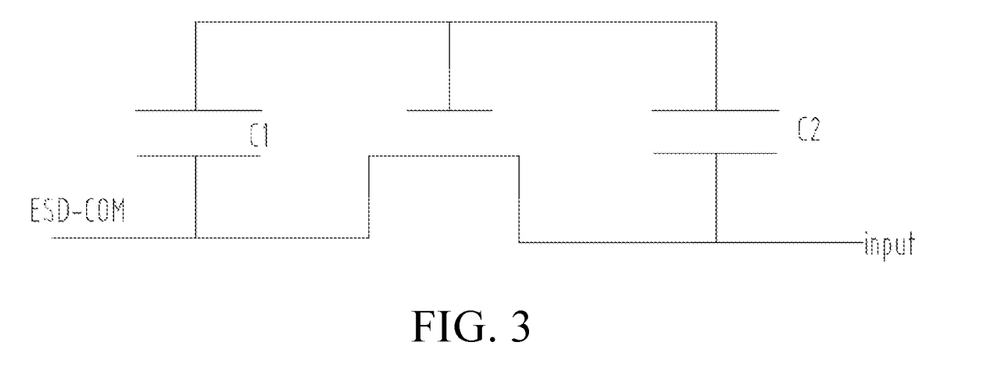
FIG. 3 is a circuit diagram of a first electrostatic protection unit provided in the embodiments of the present application.

As shown in FIG. 3, FIG. 3 is a schematic circuit diagram of the first electrostatic protection unit provided in the embodiments of this application. In the embodiments of this application, when setting up each first electrostatic protection unit 202, the first electrostatic protection unit 202 can include a thin-film transistor, as well as a first capacitor C1 and a second capacitor C2. Specifically, one end of the first capacitor C1 is electrically connected to a gate of the thin-film transistor, the other end of the first capacitor C1 is electrically connected to a first output terminal ESD-COM and a source of the thin-film transistor. One end of the second capacitor C2 is electrically connected to the gate of the thin-film transistor and one end of the first capacitor CL. The other end of the second capacitor C2 is electrically connected to a drain of the thin-film transistor and a first input terminal input. In this context, the first input terminal input can be electrically connected to the respective signal line, and receives input signals through the signal line. The first output terminal ESD-COM is directly electrically connected to the VSS test pad or the corresponding VSS test line, allowing the excess static electricity to be released through the VSS test pad and thus protecting the circuit.

In the embodiments of the present application, a capacitance value of the first capacitor C1 is equal to a capacitance value of the second capacitor C2, ensuring the effectiveness of the first electrostatic protection unit.

Figure 4:
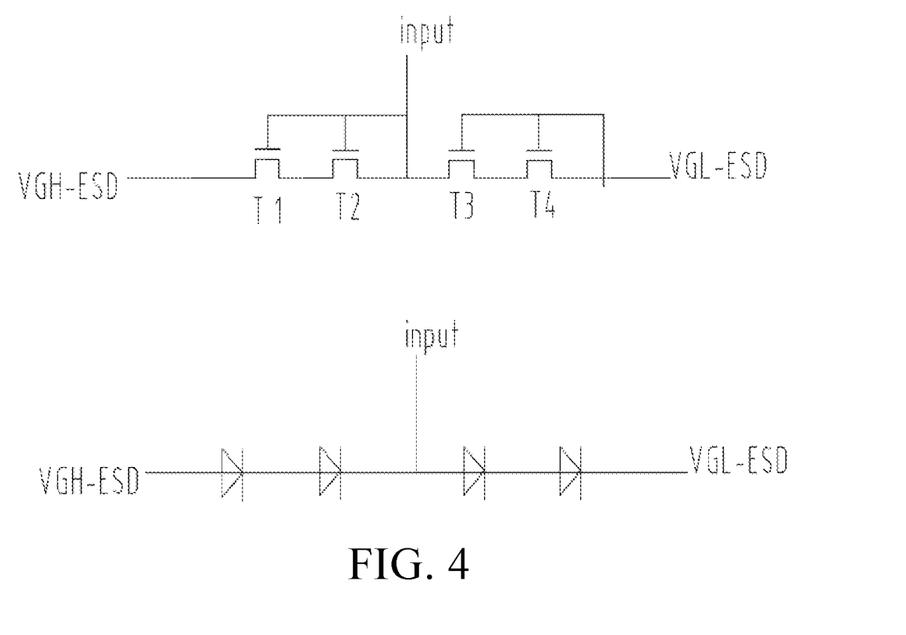
FIG. 4 is a circuit diagram of another electrostatic protection unit provided in the embodiments of this application.

As shown in FIG. 4, FIG. 4 is a schematic diagram of another circuit structure of the electrostatic protection unit provided in the embodiments of this application. In conjunction with the circuit structure in FIG. 3, in the embodiments of this application, the first electrostatic protection unit can also include multiple thin-film transistors. For example, the first electrostatic protection unit 202 can include a first thin-film transistor T1, a second thin-film transistor T2, a third thin-film transistor T3, and a fourth thin-film transistor T4.

Specifically, a source of the first thin-film transistor T1 is electrically connected to a second output terminal, while a gate of the first thin-film transistor T1 is electrically connected to a gate of the second thin-film transistor T2 and a second input terminal. A drain of the first thin-film transistor T1 is electrically connected to a source of the second thin-film transistor T2.

Simultaneously, a drain of the second thin-film transistor T2 is electrically connected to a source of the third thin-film transistor T3 and a second input terminal. A gate of the third thin-film transistor T3 is electrically connected to a gate of the fourth thin-film transistor T4 and simultaneously electrically connected to a third output terminal. A drain of the third thin-film transistor T3 is electrically connected to a source of the fourth thin-film transistor T4. In this manner, when a control signal is input to the second input terminal, the control signal can act on different thin-film transistors and ultimately be output from the second output terminal and the third output terminal, effectively providing electrostatic protection to the circuits within the display panel.

In the present embodiment, when setting up the second input terminal, the second input terminal is electrically connected to the corresponding signal line, so that control signals are provided to the second input terminal via the signal line. In addition to that, when setting up the second output terminal and the third output terminal, the second output terminal and the third output terminal can be respectively configured to correspond to two different test pads. For example, the second output terminal can be electrically connected to the VGH test pad or test line, while the third output terminal can be electrically connected to the VGL test pad or test line. Alternatively, the second output terminal and the third output terminal can be connected to other types of test pads separately, achieving electrostatic protection for the display panel.

In the embodiments of the present application, the above-mentioned VSS test pad and its corresponding test line can also be configured as a VDD test pad, meaning that no electrostatic protection units are set at the corresponding position of the VDD test pad. This allows the VSS test pad or the VDD test pad to serve as a common electrode or a common line for electrostatic protection units, thus releasing excess static electricity and protecting the circuits.

Furthermore, in the embodiments of the present application, when setting up the test pads and their corresponding electrostatic protection units, the number of the electrostatic protection units is one less than the number of the test pads. For example, if the number of the test pads is n, the corresponding number of the electrostatic protection units 202 is set to be (n−1). One test pad without an electrostatic protection unit is reserved as a common electrode or a common line. This common electrode or common line simultaneously serves as a common electrode signal line for the electrostatic protection units, thereby protecting the display panel.

In the present embodiment, when setting up the various test pads, an area of the VSS test pad is larger than areas of the CK test pad, the STV test pad, the VGL test pad, the VGH test pad, and the VDD test pad. Alternatively, the area of the VSS test pad can be set to be the same as the area of the VDD test pad. This increase in the area of the test pad corresponding to the common electrode further enhances the electrostatic protection effect for the display panel. Additionally, the number of the test pads is greater than the number of the electrostatic protection units.

As shown in FIG. 2, in the present embodiment, the display panel further includes multiple second electrostatic protection units 201. The circuit structure of the second electrostatic protection units 201 is the same as the circuit structure of the first electrostatic protection units 202. One end of the second electrostatic protection unit 201 is electrically connected to the signal line 112, and the other end of the second electrostatic protection unit 201 is electrically connected to one end of the test line 111. By placing the second electrostatic protection units between the signal lines and the test lines, and placing the first electrostatic protection units between the corresponding test pads and the common line, static electricity of the display panel is released, the quality and reliability of the display panel are improved.

Figure 5:
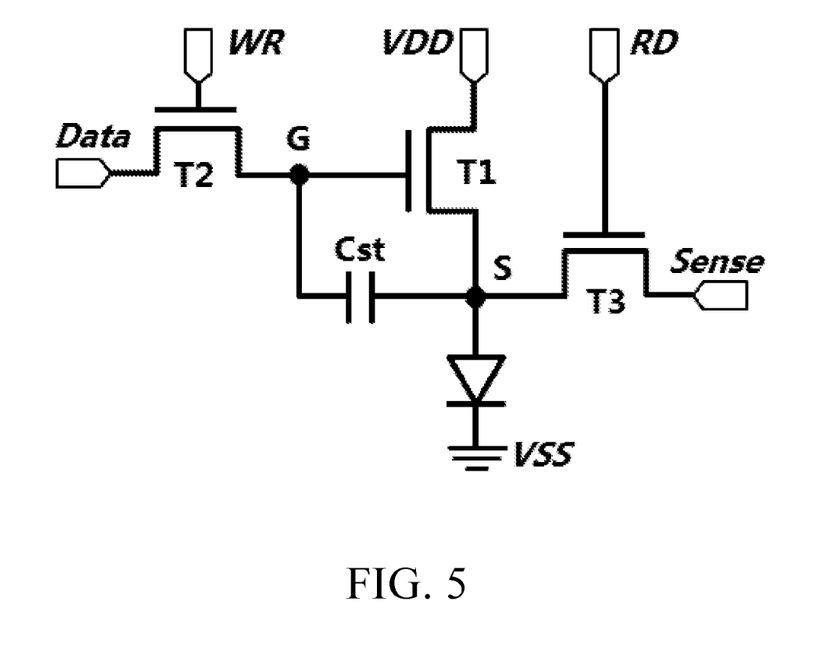
FIG. 5 is a schematic diagram of a drive circuit structure provided in the embodiments of this application.

As shown in FIG. 5, FIG. 5 provides a schematic diagram of the circuit structure in the embodiments of this application. When configuring the electrostatic protection units, the 3T1C drive circuit is taken as an example for illustration, the 3T1C drive circuit is a commonly used circuit structure, and the specific connections between components can be seen in FIG. 5 and are not further elaborated here. In the embodiments of this application, the VSS or VDD electrodes from the 3T1C circuit are used as the protective common electrodes for the electrostatic protection units. This helps in releasing static electricity from the circuits and effectively improving the quality and reliability of the display panel.

In the embodiments of the present application, a display device or an electrostatic protection device is also provided, wherein the display device or the electrostatic protection device includes the electrostatic protection unit provided in the embodiments of the present application. This electrostatic protection unit is used to discharge and protect against static electricity in the display panel. The electrostatic protection device can be applied to products or components such as mobile phones, computers, e-readers, displays, or any device with display and thin-film transistor driving functions, as well as touch functionality, and the present application is not limited to a specific type.

To sum up, the above description provides a detailed introduction to a display panel according to the embodiments of the present application. Specific examples have been used to explain the principles and implementation methods of the application. The description of the embodiments is intended to aid in understanding the technical solutions and core ideas of the application. While the preferred embodiments of the application have been disclosed, they are not intended to limit the scope of the application. Those skilled in the art may make various modifications and improvements within the spirit and scope of the application, and the scope of protection of the application is defined by the claims.

What is claimed is:

1. A display panel, comprising a display area and a non-display area arranged on one side of the display area, the display panel comprising:
   a plurality of signal lines disposed at least in the display area;
   a plurality of test lines disposed in the non-display area, each of the test lines electrically connected to a respective corresponding one of the signal lines;
   a plurality of test pads, one end of each of the test pads electrically connected to one end of a respective corresponding one of the test lines; and
   a plurality of first electrostatic protection units, one end of each of the first electrostatic protection units connected to another end of a respective corresponding one of the test pads, another end of each of the first electrostatic protection units electrically connected to a common line,
   wherein each of the first electrostatic protection units further comprises:
   a first thin-film transistor, wherein a source of the first thin-film transistor is electrically connected to a second output terminal;
   a second thin-film transistor, wherein a gate of the second thin-film transistor is electrically connected to a gate of the first thin-film transistor and a second input terminal, a source of the second thin-film transistor is electrically connected to a drain of the first thin-film transistor, and a drain of the second thin-film transistor is electrically connected to the second input terminal;
   a third thin-film transistor, wherein a source of the third thin-film transistor is electrically connected to the drain of the second thin-film transistor and the second input terminal; and
   a fourth thin-film transistor, wherein a gate of the fourth thin-film transistor is electrically connected to a gate of the third thin-film transistor and a third output terminal, a drain of the fourth thin-film transistor is electrically connected to the third output terminal, and a source of the fourth thin-film transistor is electrically connected to a drain of the third thin-film transistor.

2. The display panel according to claim 1, wherein each of the first electrostatic protection units comprises:
   a thin-film transistor;
   a first capacitor, one end of the first capacitor electrically connected to a gate of the thin-film transistor, another end of the first capacitor electrically connected to a first output terminal and a source of the thin-film transistor; and
   a second capacitor, one end of the second capacitor electrically connected to the gate of the thin-film transistor and one end of the first capacitor, another end of the second capacitor electrically connected to a drain of the thin-film transistor and a first input terminal.

3. The display panel according to claim 2, wherein a capacitance value of the first capacitor is equal to a capacitance value of the second capacitor.

4. The display panel according to claim 2, wherein the test pads comprise a VSS test pad, and the first output terminal of each of the first electrostatic protection units is electrically connected to the VSS test pad.

5. The display panel according to claim 1, wherein the second output terminal and the third output terminal are electrically connected to different respective ones of the test pads.

6. The display panel according to claim 1, wherein the test pads comprise a CK test pad, a STV test pad, a VGL test pad, a VGH test pad, a VDD test pad, and a VSS test pad, wherein each of the test pads is electrically connected to a respective corresponding one of the test lines, and a number of the test pads is greater than a number of the first electrostatic protection units.

7. The display panel according to claim 6, wherein an area of the VSS test pad is greater than areas of the CK test pad, the STV test pad, the VGL test pad, the VGH test pad, and the VDD test pad.

8. The display panel according to claim 6, wherein one end of each of the first electrostatic protection units is electrically connected to a respective corresponding one of the CK test pad, the STV test pad, the VGL test pad, the VGH test pad, and the VDD test pad, wherein an output terminal of each of the first electrostatic protection units is electrically connected to the VSS test pad.

9. The display panel according to claim 1, further comprising a plurality of second electrostatic protection units, wherein one end of each of the second electrostatic protection units is electrically connected to a respective corresponding one of the signal lines, and another end of each of the second electrostatic protection units is electrically connected to a respective corresponding one of the test lines.

10. A display panel, comprising a display area and a non-display area arranged on one side of the display area, the display panel comprising:
a plurality of signal lines disposed at least in the display area;
a plurality of test lines disposed in the non-display area, each of the test lines electrically connected to a respective corresponding one of the signal lines;
a plurality of test pads, one end of each of the test pads electrically connected to one end of a respective corresponding one of the test lines; and
a plurality of first electrostatic protection units, one end of each of the first electrostatic protection units connected to another end of a respective corresponding one of the test pads, another end of each of the first electrostatic protection units electrically connected to a common line,
wherein the test pads comprise a CK test pad, a STV test pad, a VGL test pad, a VGH test pad, a VDD test pad, and a VSS test pad, wherein each of the test pads is electrically connected to a respective corresponding one of the test lines, and a number of the test pads is greater than a number of the first electrostatic protection units,
wherein each of the first electrostatic protection units further comprises:
a first thin-film transistor, wherein a source of the first thin-film transistor is electrically connected to a second output terminal;
a second thin-film transistor, wherein a gate of the second thin-film transistor is electrically connected to a gate of the first thin-film transistor and a second input terminal, a source of the second thin-film transistor is electrically connected to a drain of the first thin-film transistor, and a drain of the second thin-film transistor is electrically connected to the second input terminal;
a third thin-film transistor, wherein a source of the third thin-film transistor is electrically connected to the drain of the second thin-film transistor and the second input terminal; and
a fourth thin-film transistor, wherein a gate of the fourth thin-film transistor is electrically connected to a gate of the third thin-film transistor and a third output terminal, a drain of the fourth thin-film transistor is electrically connected to the third output terminal, and a source of the fourth thin-film transistor is electrically connected to a drain of the third thin-film transistor.

11. The display panel according to claim 10, wherein each of the first electrostatic protection units comprises:
a thin-film transistor;
a first capacitor, one end of the first capacitor electrically connected to a gate of the thin-film transistor, another end of the first capacitor electrically connected to a first output terminal and a source of the thin-film transistor; and
a second capacitor, one end of the second capacitor electrically connected to the gate of the thin-film transistor and one end of the first capacitor, another end of the second capacitor electrically connected to a drain of the thin-film transistor and a first input terminal.

12. The display panel according to claim 11, wherein a capacitance value of the first capacitor is equal to a capacitance value of the second capacitor.

13. The display panel according to claim 11, wherein the test pads comprise a VSS test pad, and the first output terminal of each of the first electrostatic protection units is electrically connected to the VSS test pad.

14. The display panel according to claim 10, wherein the second output terminal and the third output terminal are electrically connected to different respective ones of the test pads.

15. The display panel according to claim 10, wherein an area of the VSS test pad is greater than areas of the CK test pad, the STV test pad, the VGL test pad, the VGH test pad, and the VDD test pad.

16. The display panel according to claim 15, wherein one end of each of the first electrostatic protection units is electrically connected to a respective corresponding one of the CK test pad, the STV test pad, the VGL test pad, the VGH test pad, and the VDD test pad, wherein an output terminal of each of the first electrostatic protection units is electrically connected to the VSS test pad.

17. The display panel according to claim 10, further comprising a plurality of second electrostatic protection units, wherein one end of each of the second electrostatic protection units is electrically connected to a respective corresponding one of the signal lines, and another end of each of the second electrostatic protection units is electrically connected to a respective corresponding one of the test lines.

18. A display panel, comprising a display area and a non-display area arranged on one side of the display area, the display panel comprising:
a plurality of signal lines disposed at least in the display area;
a plurality of test lines disposed in the non-display area, each of the test lines electrically connected to a respective corresponding one of the signal lines;
a plurality of test pads, one end of each of the test pads electrically connected to one end of a respective corresponding one of the test lines; and a plurality of first electrostatic protection units, one end of each of the first electrostatic protection units connected to another end of a respective corresponding one of the test pads, another end of each of the first electrostatic protection units electrically connected to a common line, wherein each of the first electrostatic protection units further comprises:

a first thin-film transistor, wherein a source of the first thin-film transistor is electrically connected to a second output terminal;

a second thin-film transistor, wherein a gate of the second thin-film transistor is electrically connected to a gate of the first thin-film transistor and a second input terminal, a source of the second thin-film transistor is electrically connected to a drain of the first thin-film transistor, and a drain of the second thin-film transistor is electrically connected to the second input terminal;

a third thin-film transistor, wherein a source of the third thin-film transistor is electrically connected to the drain of the second thin-film transistor and the second input terminal; and a fourth thin-film transistor, wherein a gate of the fourth thin-film transistor is electrically connected to a gate of the third thin-film transistor and a third output terminal, a drain of the fourth thin-film transistor is electrically connected to the third output terminal, and a source of the fourth thin-film transistor is electrically connected to a drain of the third thin-film transistor, wherein the second output terminal and the third output terminal are electrically connected to different respective ones of the test pads.

19. The display panel according to claim 18, wherein the test pads comprise a CK test pad, a STV test pad, a VGL test pad, a VGH test pad, a VDD test pad, and a VSS test pad, wherein each of the test pads is electrically connected to a respective corresponding one of the test lines, and a number of the test pads is greater than a number of the first electrostatic protection units.

20. The display panel according to claim 18, further comprising a plurality of second electrostatic protection units, wherein one end of each of the second electrostatic protection units is electrically connected to a respective corresponding one of the signal lines, and another end of each of the second electrostatic protection units is electrically connected to a respective corresponding one of the test lines.

* * * * *